(12) United States Patent
Stephens et al.

(10) Patent No.: US 9,242,489 B2
(45) Date of Patent: Jan. 26, 2016

(54) ROLLER FOR PAPER STACK SEPARATION

(71) Applicant: HEWLETT-PACKARD DEVELOPMENT COMPANY, L.P., Houston, TX (US)

(72) Inventors: Fred O. Stephens, Fort Collins, CO (US); Chalam Kashyap, Fort Collins, CO (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/753,109

(22) Filed: Jan. 29, 2013

(65) Prior Publication Data

US 2014/0210922 A1 Jul. 31, 2014

(51) Int. Cl.
| | |
|---|---|
| *B41J 29/13* | (2006.01) |
| *B41J 13/076* | (2006.01) |
| *F16C 13/00* | (2006.01) |
| *B41J 13/02* | (2006.01) |
| *B41J 11/00* | (2006.01) |
| *B41J 25/308* | (2006.01) |
| *B41J 2/21* | (2006.01) |

(52) U.S. Cl.
CPC ............ *B41J 13/076* (2013.01); *B41J 2/2114* (2013.01); *B41J 11/007* (2013.01); *B41J 13/02* (2013.01); *B41J 25/308* (2013.01); *F16C 13/00* (2013.01)

(58) Field of Classification Search
CPC ...... B41J 11/007; B41J 25/308; B41J 2/2114; B41J 13/02; B41J 13/076
USPC .............................................. 347/104, 8, 101
See application file for complete search history.

(56) References Cited

U.S. PATENT DOCUMENTS

| | | | |
|---|---|---|---|
| 5,947,471 A * | 9/1999 | De Ambrogio ............... 271/273 |
| 6,769,679 B2 | 8/2004 | Ishibashi | |
| 6,962,333 B2 | 11/2005 | Mizuno et al. | |
| 7,386,249 B2 * | 6/2008 | Bethel et al. .................. 399/105 |
| 7,866,659 B2 | 1/2011 | Izumichi et al. | |
| 2004/0260006 A1 | 12/2004 | Mabuchi et al. | |
| 2009/0079125 A1 | 3/2009 | Yuasa | |
| 2011/0156337 A1 | 6/2011 | Pan et al. | |

* cited by examiner

*Primary Examiner* — Henok Legesse
(74) *Attorney, Agent, or Firm* — Hewlett-Packard Patent Department (57) ABSTRACT

A roller includes an outer cylindrical portion and an inner cylindrical portion arranged concentrically with the outer cylindrical portion. A plurality of connection spokes are provided for connecting the outer cylindrical portion and the inner cylindrical portion to each other, wherein each of the connection spokes are connected along a non-linear connection path with respect to an axis extending between the outer cylindrical portion and the inner cylindrical portion of the roller to provide a tunable spring constant in the roller.

9 Claims, 7 Drawing Sheets

FIG. 7

ROLLER FOR PAPER STACK SEPARATION

BACKGROUND

Media processors such as printers utilize many components to control how media such as paper is guided though the printers during a printing process. Such printing components can include a feed system having rollers to initially guide the media toward a print zone where a print head applies ink on to the media, or where an image is transferred to the media. Rollers for guiding media in the printer can serve different functions. A retard roller is required in a document feeder (e.g., ADF, sheet feeder) to work in conjunction with a separation roller to help separate a single sheet of media to be fed from a small stack of media. The retard roller should have the friction, wear life, torsional stiffness, low compression set, and compression deflection characteristics to meet product performance needs. The compression deflection characteristic allows the roller to deform significantly when pressed against the separation roller to increase the contact area with the separation roller. The increased contact area provides a distance within which several sheets of paper (or other media) are separated so that only one sheet is fed through the printer.

DETAILED DESCRIPTION

A roller is provided that facilitates how media is selected and fed through a process (e.g., printing). An inner cylindrical portion and an outer cylindrical portion of the roller are connected via non-linear connection spokes that enable tunable spring constants in the roller to adjust compression characteristics in the roller. The tunable spring constants further enable efficient design of the roller by allowing the roller to be constructed of a single durometer (e.g., material) as opposed to multiple materials while also enabling desired media stack separation characteristics (e.g., the ability for one sheet to be selected from a stack of sheets). In addition to the non-linear connection spokes, the roller can have compression areas fabricated within the roller to enable the outer cylindrical portion of the roller to compress. A compression stop can be fabricated within the roller to limit the amount of overall compression in the roller. By controlling compression via the non-linear connection spokes and limiting the compression via the compression stops, a single durometer roller can be designed to accommodate different media types and different applications (e.g., media having differing thicknesses, paper media, plastic media, vellum, and so forth). The roller can be employed in printers, scanners, mail sorters, copiers, and other media sheet feed applications, for example.

Figure 1:
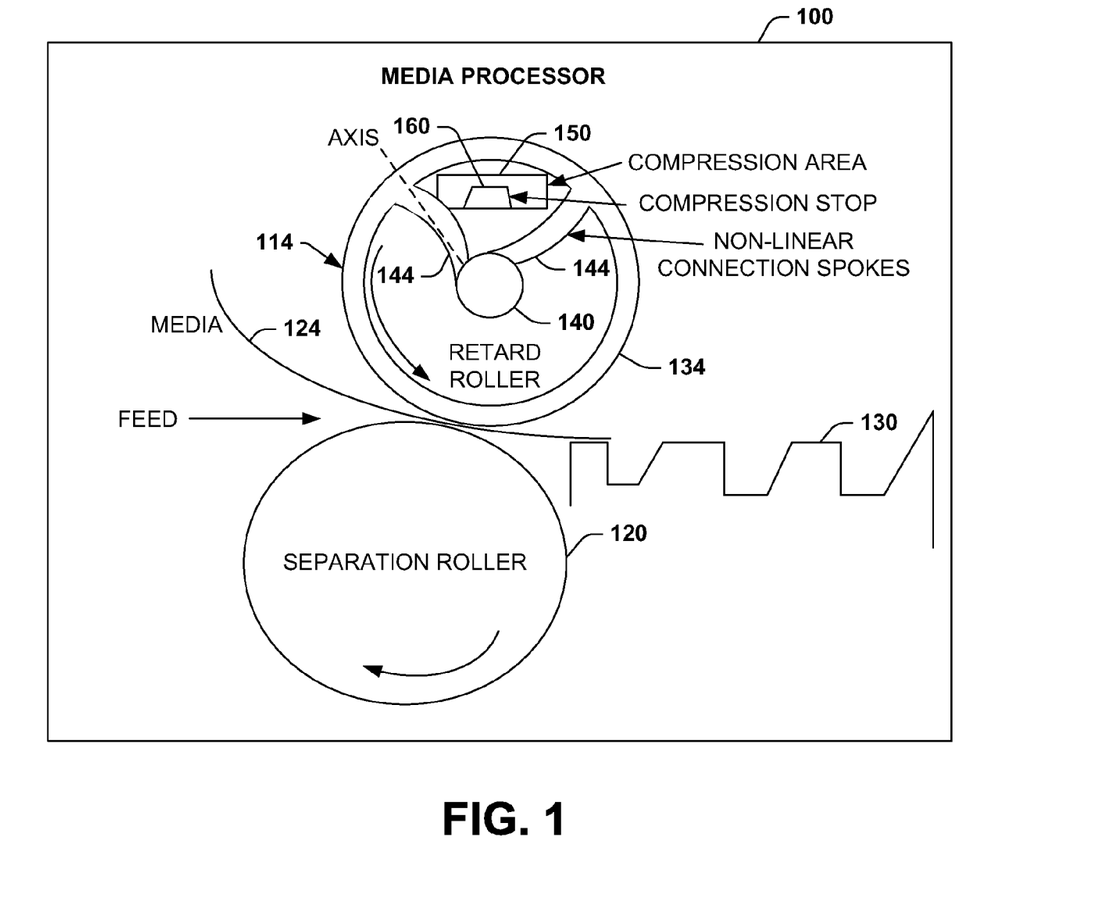
FIG. 1 illustrates an example media processor that utilizes a roller having non-linear connection spokes to facilitate media stack separation.

FIG. 1 illustrates an example media processor 100 that utilizes a roller 114 having non-linear connection spokes to facilitate media stack separation. As used herein, the term media processor 100 refers to any apparatus that employs rollers to feed sheets of media in the apparatus. Such media processor 110 can include printers, scanners, copiers, fax machines, mail sorters, media folding equipment, and so forth. The roller 114 can also be referred to as a retard roller since it is a passive roller (e.g., not driven) and is rotated by contact with a separation roller 120 which is driven by a motor in the media processor 100. As shown, media 124 is fed through the retard roller 114 and the separation roller 120 where the media is guided through the process along a platen 130 in the media processor 100. Contact between the separation roller 120, the retard roller 120, and the media 124 form a compressive force on the retard roller.

The retard roller 114 includes an outer cylindrical portion 134 and an inner cylindrical portion 140 arranged concentrically with the outer cylindrical portion. A plurality of non-linear connection spokes 144 are provided for connecting the outer cylindrical portion 134 and the inner cylindrical portion 140 to each other. Each of the non-linear connection spokes 144 are connected along a non-linear connection path with respect to an axis (shown as dotted line) extending between the outer cylindrical portion and the inner cylindrical portion of the retard roller 114 to provide a tunable spring constant in the roller. As used herein, non-linear refers to any connection path along the path of the connection spokes 144 between the outer cylindrical portion 134 and the inner 140 that does not follow a single straight line. In one example, a single curve between inner and outer cylindrical portions 134 and 144 may be employed as the non-linear connection spoke 144. In another example, multiple curves between inner and outer cylindrical portions 134 and 140 may be employed as the non-linear connection spoke 144 (e.g., S-shaped spokes). Other non-linear shapes than curves are also possible for the connection spokes 144 (e.g., zig-zag).

The outer cylindrical portion 134, the inner cylindrical portion 140, and the connection spokes 144 can form a compression area 150 in the retard roller 114, wherein a compression-stop 160 is formed inside the compression area to limit compression on the outer cylindrical portion in the roller. In one example, the compression-stop 160 can have two sides extending toward the inner cylindrical portion 140 and a top portion connecting the two sides, wherein the top portion contacts a point inside the compression area 150 to limit compression on the outer cylindrical portion 134 in the retard roller 114. In another example, the top portion of the compression-stop 160 can extend laterally past one of the two sides to increase the surface area of the compression-stop and to facilitate increased contact with the point inside the compression area 150. In yet another example, the top portion of the compression-stop 160 can extend laterally past both sides of the two sides to increase the surface area of the compression-stop and to facilitate increased contact with the point inside the compression area 150.

Another example can include multiple compression stops 160 inside the compression area 150 to limit compression on the outer cylindrical portion 134 in the retard roller 134. The outer cylindrical portion 134, the inner cylindrical portion 140, and the connection spokes 144 form layered compression areas in the roller, wherein a compression-stop is formed inside one of the layered compression areas to limit compression in the roller. A compression-stop can be formed inside each of the multiple compression areas to limit compression in the retard roller 114. Various examples of non-linear connection spokes, compression stops, and compression areas will be illustrated and described below. The platen 130 acts as a guide for the media 124 and enables the media to pass though the media processor 100.

Typically, a solid roller material of a single durometer would not be able to meet all of the desired characteristics of a retard roller 114 in a high performance feeder. Conventionally, this was solved by placing a high wear life, high friction sleeve or tire over a foam core. The relatively thin sleeve is somewhat harder than the foam, but is thin enough to deflect enough to create the desired separation distance. The backing provided by the foam core compresses the tire against the separation roller while providing compliance and transmitting the torque to the hub, shaft, and/or clutch.

The retard roller 114 employs a solid roller material similar in characteristics to the tire or sleeve of a dual durometer roller to mimic and improve upon the dual durometer construction by adding one or more non-linear spokes 144 between inner and outer cylindrical portions 140 and 134. To provide similar characteristics from a single durometer roller with spokes, the thickness of the outer cylindrical portion 134 may need to be increased. The shape of the connection spokes 144 and the thickness of the outer cylindrical portion 134 can be utilized to create similar compression deflection characteristics to the dual durometer roller while only using a single material in the construction of the retard roller 114. The shape of the connection spokes 144 also can have an effect on the consistency of the compression deflection as the retard roller 114 rotates.

For example, the compression deflection characteristics measured on the material (e.g., rubber) between the connection spokes 144 can be lower than at the spokes. The difference can be very large for straight radial spokes in conventional rollers. It would be substantially lower for straight spokes that attach to the outer cylindrical portion approaching tangentially. As tangential attachment may not be practical from a tooling standpoint, shaping the connection spokes 144 so that they are not straight can provide a lower spring constant while being practical to manufacture in a single process. The variety of shapes and number of connection spokes 144 are variables that allow for tuning a roller design to meet the product requirements that would not be available in a single durometer solid roller without spokes.

The retard roller 114 can be a cast or molded roller consisting of an outer cylindrical portion 134, one or more non-linear spokes 144, connecting the outer cylindrical portion to the inner cylindrical portion 140. The retard roller 114 is typically mounted on a hub which is able to turn on a shaft. The retard roller 114 provides torsional resistance by being engaged with a friction clutch on the shaft. The friction between the retard roller 114 and separation roller 120 should be high enough to overcome the torque of the retard clutch. This allows the retard roller 114 to turn and allows media 124 to enter the separation region of contact between the two rollers.

The friction between media 124 and the retard roller 114 should be higher than friction between media-to-media. This can allow the retard roller 114 to stop turning and separate pages in the stack from the page being driven by direct contact with the separation roller 120. The separation roller 120 can be relatively hard compared to the retard roller 114. The force between the separation roller 120 and retard roller 114 should be high enough to deform the retard roller 114 to create a suitable contact area while allowing the separation roller to minimally deform. This allows the separation roller 120 to control the speed of the media 124 as it feeds, while the retard roller 114 holds back all but the sheet in direct contact with the separation roller. The relative lower apparent hardness of the retard roller 114 can be achieved by the construction using the shaped spokes 144 as springs to soften the compression characteristics of the roller.

When a small stack of media 124 is in contact with either the retard roller 114 or separation roller 120 and the separation roller is turning, the media stack can be pulled into the contact area between the two rollers. The friction at the contact area of the retard roller 114 should be high enough to overcome the clutch when there is no media feed and low enough to not rotate when media is between the rollers. The single durometer construction of the retard roller 114 improves manufacturability by reducing the number of parts to produce the roller. This also improves robustness by eliminating the inner core material of a dual durometer which is typically a foamed elastomer and replacing it with cast or injection molded non-foamed elastomer. The retard roller 144 also improves the design range for compression deflection by using shaped spokes 144 in the place of the foam core.

Figure 2:
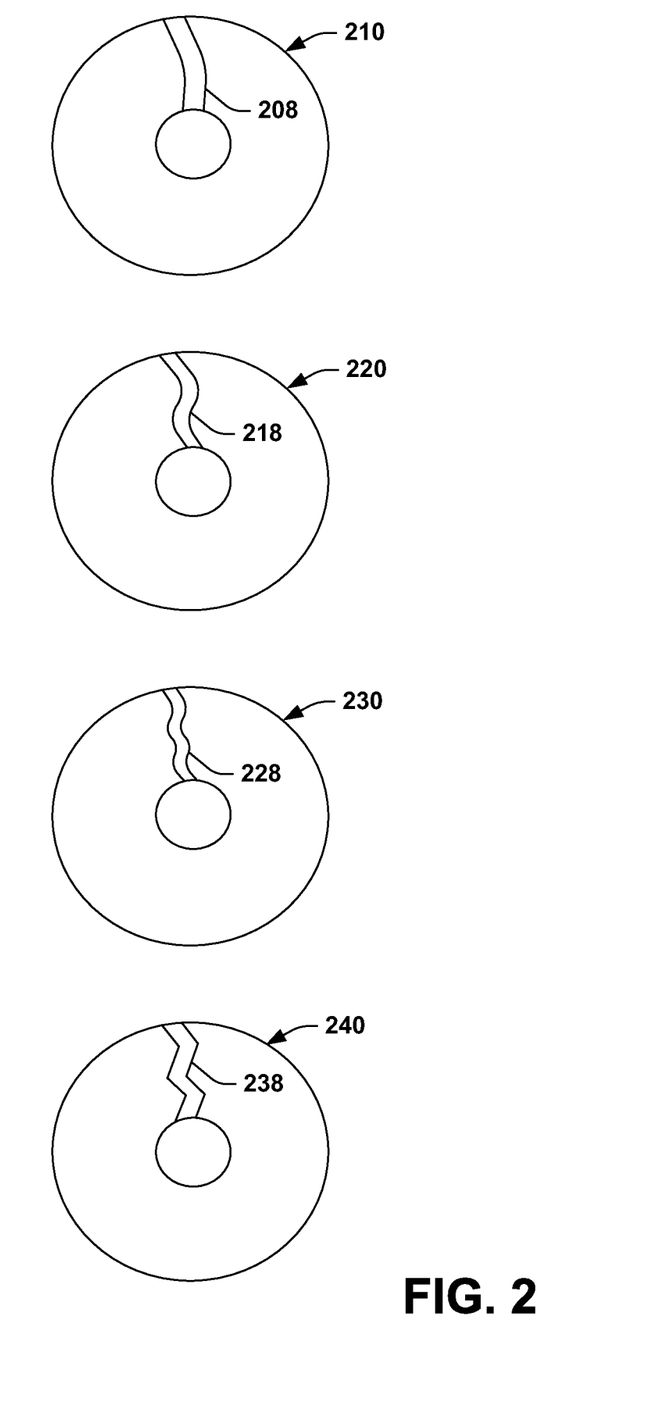
FIG. 2 illustrates examples of non-linear connection spokes between an inner and outer cylindrical portion of a retard roller.

FIG. 2 illustrates examples of non-linear connection spokes between an inner and outer cylindrical portion of a retard roller. For purposes of brevity, only a single spoke is shown connecting the inner and outer cylindrical portion of the respective retard rollers however, each roller utilizes a plurality of such spokes as will be illustrated and described below with respect to FIGS. 4-6. A nonlinear compression spoke 208 is illustrated between an inner and outer cylindrical portion of a retard roller 210. In the example of roller 210, a single curve forms the non-linear path of the connection spoke 208. A non-linear compression spoke 218 is illustrated between an inner and outer cylindrical portion of a retard roller 220. As shown, the compression spoke 218 contains multiple curves and in this example forms an S-pattern between the inner and outer cylindrical portion of the retard roller 220. Similarly, a plurality of curves is employed for the non-linear connection path 228 between an inner and outer cylindrical portion of a retard roller 230. In yet another example, a zig-zag path of connecting lines forms the non-linear path of a connection spoke 238 formed between an inner and outer cylindrical portion of a retard roller 240. Various other non-linear connection spokes can be provided between an inner and outer cylindrical portion of a retard roller.

Figure 3:
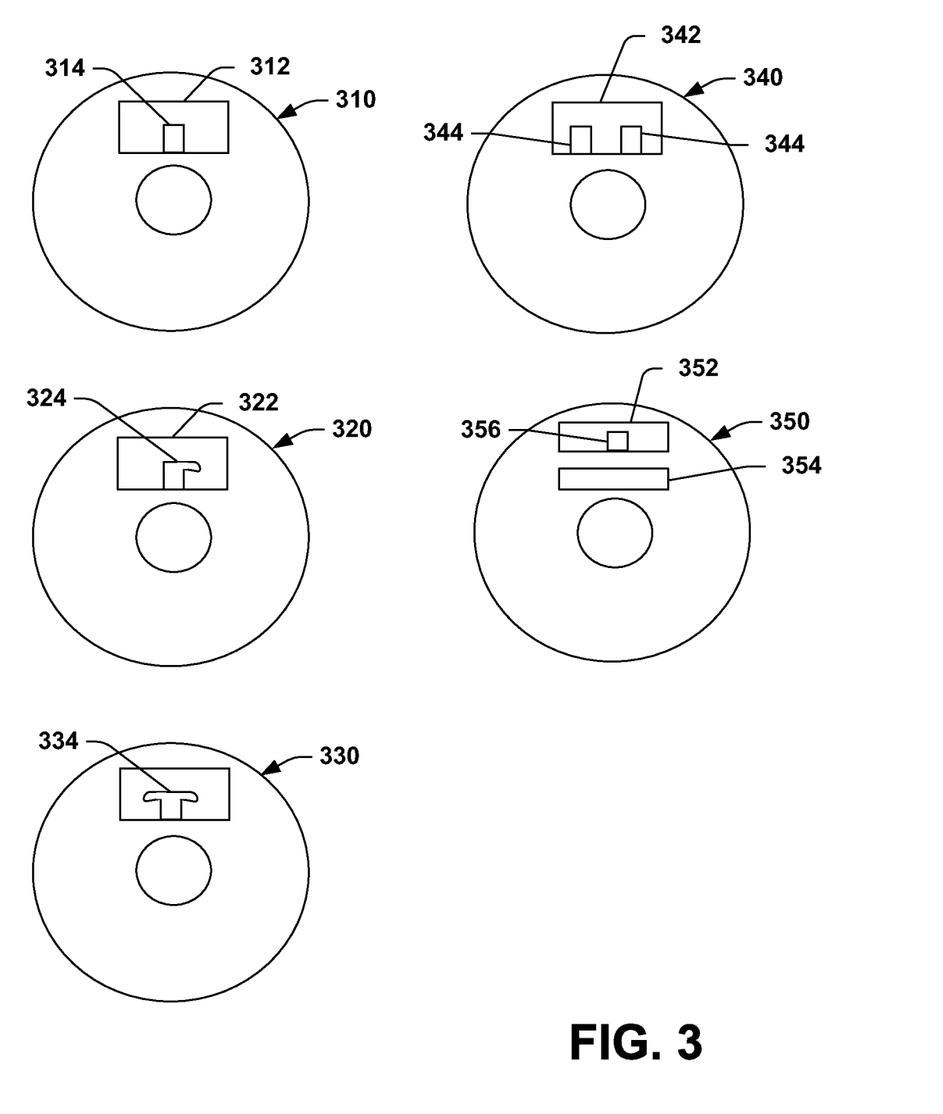
FIG. 3 illustrates examples of compression areas having associated compression stops located between an inner and outer cylindrical portion of a retard roller.

FIG. 3 illustrates examples of compression areas having associated compression stops located between an inner and outer cylindrical portion of a retard roller. For purposes of brevity, only a single compression area having an associated compression stop is shown with each of the example retard roller however, each roller utilizes a plurality of such areas and stops as will be illustrated and described below with respect to FIGS. 4-6. A retard roller 310 shows a single compression area 312 having a rectangular compression stop 314. Although a rectangular shape is shown for the compression area 312 and compressions stop 314, substantially any shape can be employed such as circular, elliptical, a square shape, trapezoidal, and so forth.

A retard roller 320 shows a compression area 322 having a compression stop 324, wherein the compression stop has the top elongated on one side to provide a larger compression region for the compression stop. Similarly, a retard roller 330 illustrates a compression stop 334 having the top of the stop elongated on both sides to provide a larger compression region for the compression stop. A retard roller example 340 illustrates a compression area 342 having multiple compression stops 344. A retard roller 350 shows multiple compression areas 352 and 354 that are layered over each other and in between the outer cylindrical portion and the inner cylindrical portion of the roller. In this example, a single compression stop is formed in one of the compression areas at 356, however each compression area can have its own compression stop in other examples.

Figure 4:
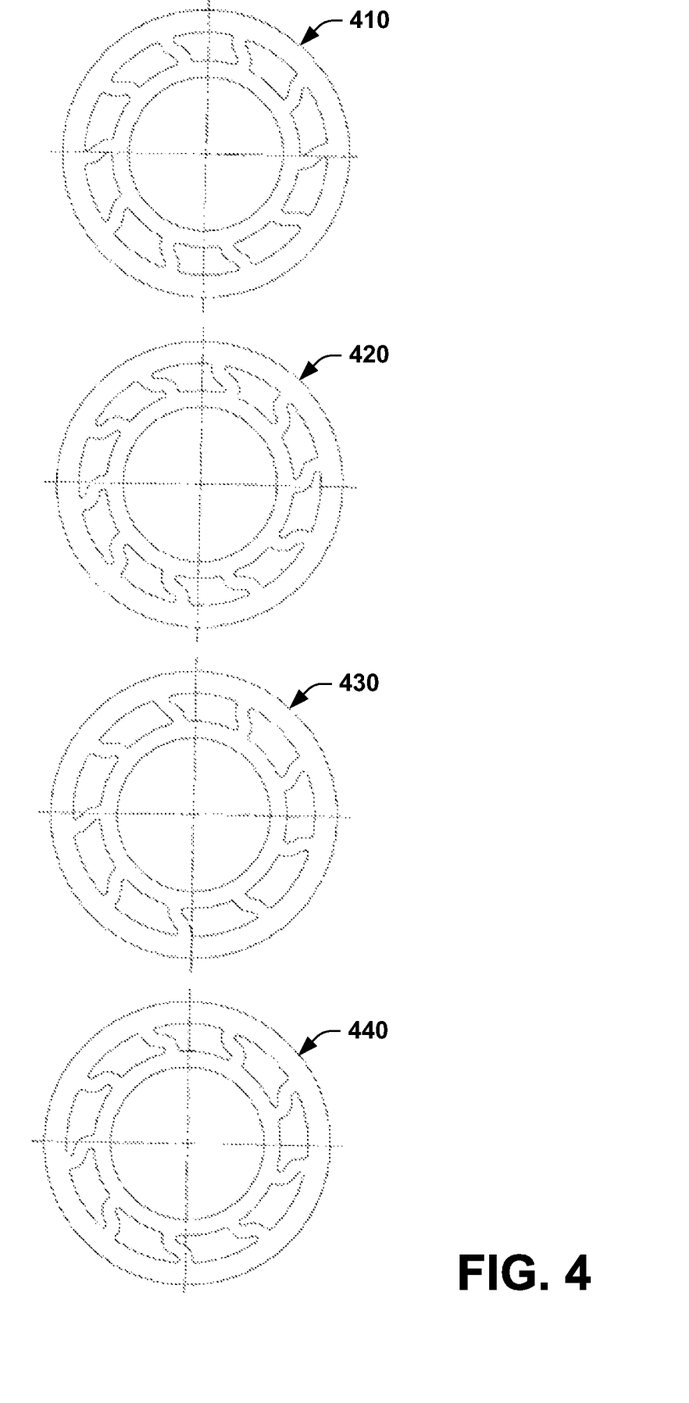
FIG. 4 illustrates example retard rollers having compressing areas without compression stops.

FIG. 4 illustrates example retard rollers having compressing areas without compression stops. In this example, retard rollers 410, 420, 430, and 440 are shown where each of the rollers have varying degrees of non-linearity for the connection spokes that connect the inner and outer cylindrical portions. Similarly, as the non-linearity is varied, the compression areas in the retard rollers can also vary.

Figure 5:
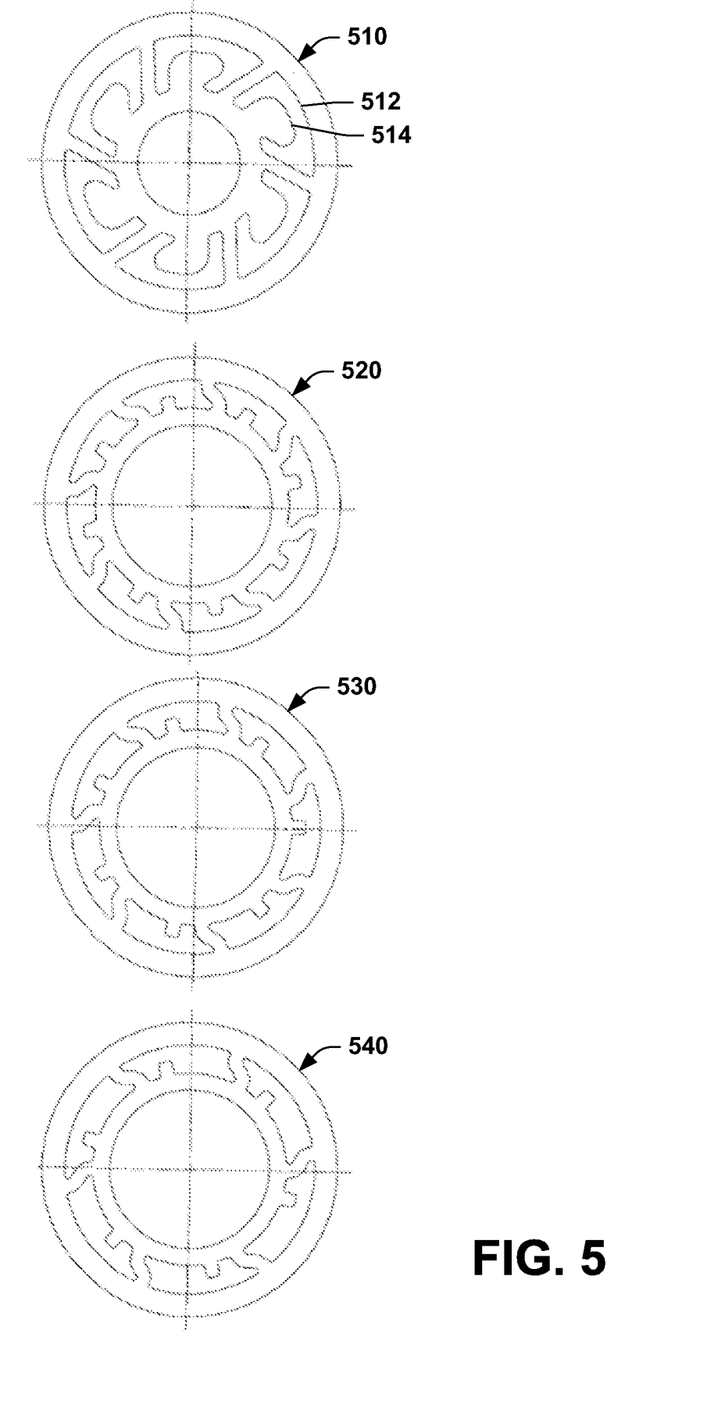
FIG. 5 illustrates example retard rollers having compressing areas with associated compression stops.

FIG. 5 illustrates example retard rollers having compressing areas with associated compression stops. A retard roller 510 shows straight compression spokes separating an inner and outer cylindrical portion of the roller however, as shown within compression area 512, an elongated compression stop (e.g., daisy petal pattern) 514 is provided. It is also possible to provide non-linear spokes in the roller 510 rather than the straight connection spokes. The shape of the compression stop 512 provides useful properties for the roller 510. For example, as the separation roller/paper pull the outer ring in a clockwise direction, the spoke deflects and gains support from contact with the back portion of the compression stop 512. This allows use of a longer support (more flexible) while maintaining the needed compression range on the outer tire and thus, keeping the outer ring from the larger phase change that would have occurred without supporting the spokes. This provides another level of tuning to the spring constant.

Roller 520, 530, and 540 all have non-linear compression spokes with rectangular compression stops within each compression area. As shown, in some examples such as at 520, the compression stops can be centered within the compression areas. In the roller examples of 530 and 540, the compression stops are offset from the center of the compression area.

Figure 6:
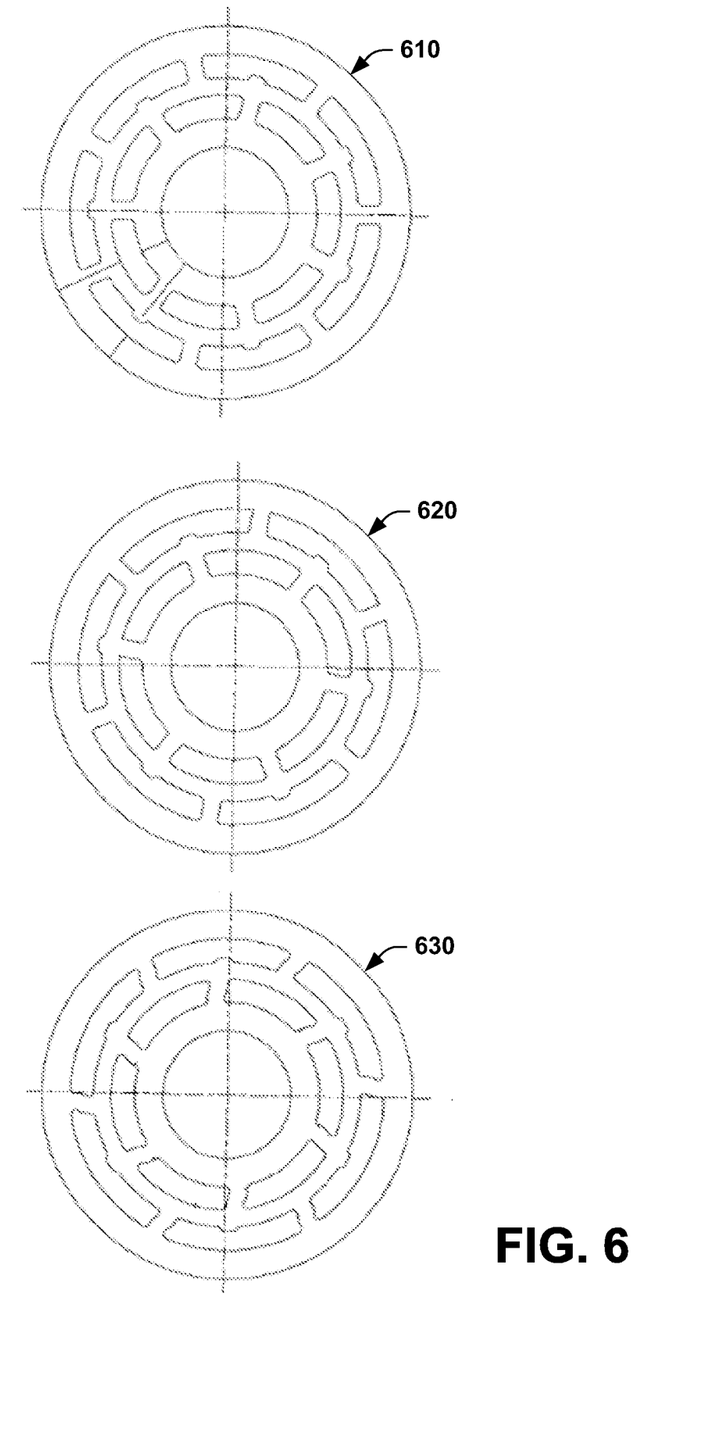
FIG. 6 illustrates example retard rollers having multiple compression areas.

FIG. 6 illustrates example retard rollers having multiple compression areas. As shown, each of the retard rollers 610, 620, and 630 have multiple layered compression areas between the inner and outer cylindrical portions of the respective rollers. In the example of 610, straight connection spokes flow between the respective connection areas and between the inner and outer cylindrical portions of the respective roller. Also, the outmost compression are near the outer cylindrical portion of the roller 610 contains a minor compression stop. It is also possible to include a compression stop in each compression area. Roller 620 shows straight connection spokes flowing between elongated and layered compression areas. Rollers 630 is an example where non-linear spokes flow between the respective compression areas and the inner and outer cylindrical portions of the roller.

Figure 7:
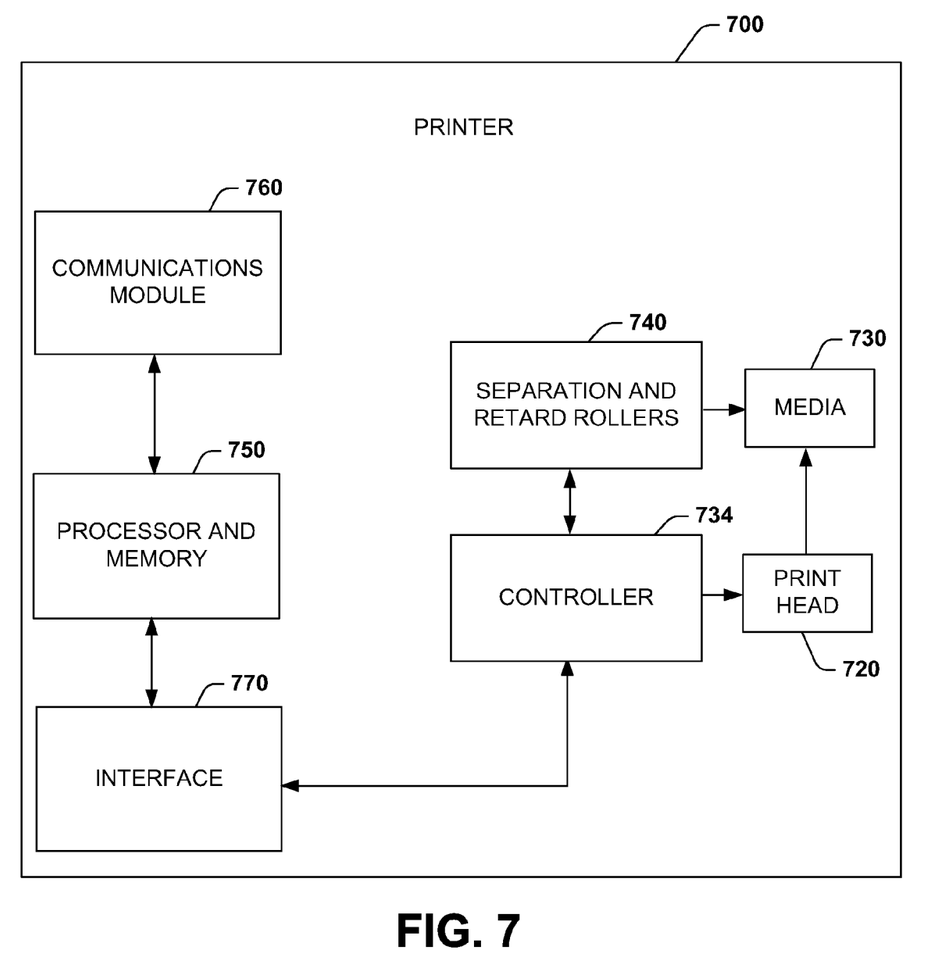
FIG. 7 illustrates an example printer that utilizes a roller having non-linear connection spokes to facilitate media stack separation during a printing process.

FIG. 7 illustrates an example printer 700 that utilizes a roller having non-linear connection spokes to facilitate media stack separation during a printing process. The printer 700 includes a print head 720 to dispense ink on a media 730. A controller 734 commands the print head 720 to dispense the ink on the media 730. Separation and retard rollers 740 as described herein receive the media 730 and guide it into the print area under the print head 720, wherein the controller 734 controls the separation roller to adjust the speed and direction of the media 730. A processor and memory module 750 can direct remote print commands to the controller 734. As noted above, the retard roller is passive and reacts to pressure and movement of the separation roller.

The printer 700 can also include a communications module 760 for receiving print commands and updating printer status. The communications module 760 can include local connections such as from a print cable and/or can include remote network connections such as can be received from a local network and/or over a public network such as the Internet, for example. The communications module 760 can be operated by the processor and memory module 760 which can include executable operating instructions to operate the printer 700. The processor and memory module 750 can also connect to an interface module 770 that performs interface operations to the controller 734 such as providing different print commands to the controller such as print, hold, retract, form feed, font commands, color commands, or other formatting commands, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A roller comprising:
   an outer cylindrical portion;
   an inner cylindrical portion arranged concentrically with the outer cylindrical portion;
   a plurality of connection spokes for connecting the outer cylindrical portion and the inner cylindrical portion to each other, wherein each of the connection spokes are connected along a non-linear connection path with respect to an axis extending between the outer cylindrical portion and the inner cylindrical portion of the roller to provide a tunable spring constant in the roller, wherein the outer cylindrical portion, the inner cylindrical portion, and the connection spokes form a plurality of compression areas in the roller, and wherein the outer cylindrical portion, the inner cylindrical portion, and the connection spokes are formed with a single material;
   a compression stop inside at least one of the plurality of compression areas to limit compression in the roller; and
   wherein the plurality of compression areas comprises multiple layered compression areas, where the compression-stop is formed inside one of the layered compression areas.

2. The roller of claim 1, wherein the non-linear connection path of the connection spokes is provided by a connection path with a single curve along the axis extending between the outer cylindrical portion and the inner cylindrical portion of the roller to provide an adjustable spring constant in the roller.

3. The roller of claim 1, wherein the non-linear connection path of the connection spokes is provided by a connection path with multiple curves along the axis extending between the outer cylindrical portion and the inner cylindrical portion of the roller to provide an adjustable spring constant in the roller, and wherein the multiple curves of the connection path forms an S-pattern between the outer cylindrical portion and the inner cylindrical portion of the roller.

4. The roller of claim 3, wherein the compression-stop is formed inside each of the multiple compression areas to limit compression in the roller.

5. The roller of claim 1, wherein the compression-stop has two sides extending toward the inner cylindrical portion and a top portion connecting the two sides, wherein the top portion contacts a point inside the compression area to limit compression on the outer cylindrical portion in the roller.

6. The roller of claim 5, wherein the top portion of the compression-stop extends laterally past one of the two sides to increase the surface area of the compression-stop and to facilitate increased contact with the point inside the compression area.

7. The roller of claim 5, wherein the top portion of the compression-stop extends laterally past both sides of the two sides to increase the surface area of the compression-stop and to facilitate increased contact with the point inside the compression area.

8. The roller of claim 1, further comprising multiple compression stops inside the compression area to limit compression on the outer cylindrical portion in the roller.

9. The roller of claim 1, wherein the outer cylindrical portion, the inner cylindrical portion, and the connection spokes are formed from a cast or a mold of the single material.

* * * * *